United States Patent [19]

Izzi

[11] 4,285,979
[45] Aug. 25, 1981

[54] BREAD MAKING PROCESS AND PRODUCT THEREOF PARTICULARLY WELL SUITED FOR FREEZING AND REHEATING

[76] Inventor: Edmund F. Izzi, 8500 Magnolia Dr., Lanham, Md. 20801

[21] Appl. No.: 155,972

[22] Filed: Jun. 3, 1980

Related U.S. Application Data

[63] Continuation-in-part of Ser. No. 910,892, May 30, 1978, abandoned.

[51] Int. Cl.³ .............................................. A21D 6/00
[52] U.S. Cl. ...................................... 426/94; 426/95; 426/27; 426/302; 426/549; 426/556; 426/439; 426/496; 426/497; 426/517
[58] Field of Search .................. 426/19, 27, 94, 95, 426/302, 438, 439, 549, 556, 560, 496, 497, 512, 516, 517, 524, 502

[56] References Cited

U.S. PATENT DOCUMENTS

| | | | |
|---|---|---|---|
| 1,596,652 | 8/1926 | Giovannetti | 426/556 X |
| 2,668,117 | 2/1954 | Bucci | 426/19 |
| 3,143,424 | 8/1964 | Wilson | 426/439 X |
| 3,353,962 | 11/1967 | Smith | 426/242 |
| 3,608,474 | 9/1971 | Liepa | 99/353 |
| 3,615,679 | 10/1971 | Tangel et al. | 426/62 |
| 3,667,963 | 6/1972 | Katter et al. | 426/549 |
| 3,966,983 | 6/1976 | Dexter et al. | 426/439 |
| 4,170,659 | 10/1979 | Totino et al. | 426/439 X |
| 4,208,441 | 6/1980 | Westover | 426/524 X |

OTHER PUBLICATIONS

David, *Italian Food*, 146, (1958).
Banese, *Italian Cooking Home Style*, 165, (1974).
*The Joy of Cooking*, Bobb Merrill Co., Inc., 544, (1951).
Rombauer, *The Joy of Cooking*, The Bobbs–Merrill Co., Inc., Indianapolis, 245, 613, 619, (1975).

*Primary Examiner*—Esther M. Kepplinger

[57] ABSTRACT

A process for making a bread-like product comprising the steps of frying in hot oil at a temperature of 360°–370° F. pieces of dough which have been formed into a desired shape and thickness for a predetermined period of time to only partially cook the same. The frying step is followed by a subsequent step of baking the fried bread pieces at a temperature of, for example, 375° F., for 15–25 minutes to complete the cooking thereof. Also, the product, i.e., the bread-like pieces, obtained by carrying out the above-described process, may be consumed as regular bread, bread sticks, or used to produce products such as pizzas, garlic bread, pastry hors d'oeuvres or sandwiches (frozen or otherwise). The bread product resulting from the combined steps of frying and baking is undistorted.

18 Claims, 14 Drawing Figures

BREAD MAKING PROCESS AND PRODUCT THEREOF PARTICULARLY WELL SUITED FOR FREEZING AND REHEATING

BACKGROUND OF THE INVENTION

This application is a continuation-in-part of application Ser. No. 910,892 filed May 30, 1978, which is now abandoned.

1. Field of the Invention

This invention relates to a process for making cooked, substantially uniformly shaped, bread-like pieces and the product thereof. More particularly, the invention is concerned with a batch or semi-continuous process wherein preformed dough pieces are first fried to partially cook the same and then subjected to a final baking step to complete the cooking thereof and obtain the desired cooked bread product. The process of the present invention is particularly well suited for making frozen bread products, such as frozen pizzas.

2. Description of the Prior Art

Heretofore bread products have traditionally been cooked from start to finish solely by baking. These products generally have a satisfactory taste, texture and quality if eaten fresh from the oven or within a reasonable time thereafter. In most cases, however, these baked bread products become soggy if frozen and thawed by reheating.

Freezing and reheating particularly become a problem when the bread product is coated with ingredients such as a pizza topping or sandwich filling. The resulting frozen product produced from a totally baked bread product usually becomes soggy after freezing and lacks the requisite amount of crispness to compare favorably with a fresh, unfrozen product.

Attempts have been made to overcome this sogginess, or lack of crispness, in frozen pizzas by frying the pizza shell in oil to substantially complete the cooking thereof. See for example, one recent method described in U.S. Pat. No. 4,170,659 to Totino et al issued Oct. 9, 1979.

However, as pointed out in great detail in the disclosure of Totino, a fried pizza shell will distort during the frying process. This distortion is in the form of surface blisters or internal delaminations, both of which lead to pizza shells of unpredictable sizes. As stated in Totino, this presents a very serious obstacle with respect to commercialization of frozen pizzas because the pizzas must be packaged in cartons of uniform sizes to be marketable.

The patented Totino process allegedly solves the distortion problem by piercing the dough shell with a symmetrical pattern of holes before frying and physically confining the surfaces of the dough shell during frying to preclude expansion beyond predetermined limits. This process does appear to result in a cooked pizza shell of controllable external dimensions and a crust of an improved amount of crispness compared to frozen pizzas known prior to the Totino et al process. In fact, the pizzas produced by the Totino process described in the aforementioned patent have apparently been quite successful commercially as evidenced by the sales figures reported in the Feb. 26, 1980 issue of *The Wall Street Journal* in an article entitled "A Matter of Taste: New Food Products are Becoming More Costly to Introduce and are Failing More Often".

However, even though the aforementioned Totino method is clearly an improvement over most known methods for making frozen pizza pies, at least in the opinion of one test group, in some instances the crust of frozen pizzas sold under the name "Totino's Revolutionary Party" ("Totino" is a registered trademark owned by The Pillsbury Co.), is "cracker-like, hard, or dry". See for example the results of the tests reported in *Consumer Union,* January 1980, Vol. 45, No. 1, page 27.

It appears that the "cracker-like" consistency may occur because the areas under the blisters in the product formed by the process of U.S. Pat. No. 4,170,659 to Totino are delaminated and contain air rather than a moist, bready consistency from face-to-face of the crust. Thus, although the Totino et al process produces clearly improved frozen pizza, it still in the opinion of some, i.e., Consumer Union's Panel, does not compare favorably with a fresh pizza crust.

Furthermore, the method for controlling distortion described in the Totino et al Patent requires special machinery to perforate the dough and to restrain the surfaces thereof during frying.

Another known process which recognizes and allegedly solves the problem of a form of distortion accompanying the frying of thin pieces of dough is described in U.S. Pat. No. 3,966,983 to Dexter et al. In Dexter, thin-dough slices are first precooked in hot oil until the dough becomes stiff and then cooking is completed by a deep fat frying technique. Thus, the product formed by the Dexter Patent is totally fried. The Dexter process is not disclosed as being particularly well suited for cooking frozen bread products such as pizzas. In fact, neither pizzas nor frozen products are mentioned in Dexter. The fried products of Dexter are disclosed as being either grain based doughs, such as mixtures of rusk, raw starch and water, or food in its natural form such as potato slices. It appears that the type of distortion being controlled in Dexter is related to any change in external dimensions and shape likened to the curling of potato chips. Thus, Dexter does not specifically state how to control internal distortion such as the delaminations present between the perforations in the fried pizza crust of the aforementioned patented Totino process.

Still another known process for controlling external distortion accompanying deep fat frying is described in U.S. Pat. No. 3,608,474 to Liepa et al. In Liepa, dough pieces of synthetic potato chips are confined in a mold during deep fat frying, so that the final external shape of the chip is controllable.

Thus, the aforementioned U.S. Patents to Totino, Dexter, and Liepa disclose three different processes for controlling the external distortion of fried dough products.

Other processes not concerned with the distortion problems discussed above have addressed the problem of making a better frozen pizza. For example, a French Bread pizza is described in U.S. Pat. No. 3,667,963 to Katter et al. Katter provides a baked hard roll half which is sealed on the soft interior surface with an edible sealant to prevent the sauce from penetrating and creating a soggy crust. The roll of Katter et al is totally precooked by baking. The use of a sealant to prevent sogginess is also taught by U.S. Pat. No. 2,668,117 to Bucci.

U.S. Pat. No. 3,615,679 to Musetti attempts to solve the sogginess problem of frozen pizza by pre-baking the crust. While this pre-baking step may help, it does not totally or even adequately solve the sogginess problem.

Thus, there is still a need in the art for an improved process for making frozen bread products such as pizzas, sandwiches or the like, which are not soggy when reheated following freezing. There is also a need in the art for an improved method for controlling both internal and external distortions accompanying the frying of substantially flat sheets of bread dough.

Other conventional methods of preparing fresh pizzas other than by baking are by pan frying. Totally pan fried pizzas are generally described in the publications *Italian Food,* David (1958) at page 146 and *Italian Cooking Home Style,* Barese (1974) at page 165. These totally fried pizzas, however, do not freeze to an acceptable quality as compared to when they are fresh, and suffer from the distortion problems discussed hereinbefore.

SUMMARY OF THE INVENTION

Accordingly, it is a primary object of the present invention to provide a process for cooking a bread product which is particularly well suited for producing a frozen bread product suitable for large scale commercialization.

It is another object of the present invention to provide a process for preparing a bread product under controlled conditions which substantially precludes external or internal distortion of the bread product, said bread product having a crisp outer shell and a moist, bready interior.

It is yet another object of the present invention to provide a process for producing an improved pizza, fresh or frozen, having a crust with a crisp outer shell and a moist, bready interior.

It is still another object of the present invention to provide a process for preparing a bread product suitable for making a sandwich, fresh or frozen, which is substantially not adversely affected by moisture in the sandwich filling either before or after freezing.

A further object of the present invention is to produce bread sticks having a crisp outer shell and a moist, bready interior which can be frozen and compare favorably upon reheating with fresh out-of-the-oven bread sticks.

Another object of the invention is to provide a practical and economic process which is adapted to the commercial production of bread products by a sequence of large-scale frying and baking steps.

Still another object of the present invention is to provide a bread-like product which can be frozen after frying and baking, and heated in an unpreheated oven to obtain a bread product with a crisp outer shell and a moist, bready interior which is not adversely effected by the freezing process.

A further object of the present invention is to provide a bread product which may be used as an improved base for garlic bread, desserts or hors d'oeuvres, frozen or otherwise.

The objects of the present invention are fulfilled by the improved process of preparing a bread dough; forming the bread dough into a substantially flat sheet; frying the dough sheet in oil for a period of time sufficient to seal the surfaces of the sheet and partially cook the same, the frying time being insufficient to permit distortion of the shape and internal consistency of the sheets; and baking the dough subsequent to frying to substantially complete the cooking thereof.

The resulting cooked bread product prepared by the process of the present invention has a crisp outer shell and a moist, bready interior and maintains substantially the same shape as the original uncooked dough sheet. The crisp outer shell and the moist, bready interior combines the advantages of both thin and thick crust pizzas. Note, for example, *Consumer Union,* Vol. 45, No. 1 published January, 1980 which states on page 25 with respect to the requirements of "excellent" pizza that "a thin crust should be crisp. A thick one should be soft and chewy in the center". The present invention achieves both of these characteristics in the same crust.

The process of the present invention addresses and cures two types of distortions which occur in fried bread products known heretofore. Applicant has discovered that if the bread product is fried for a limited predetermined period of time and the cooking process is completed by baking, that both internal and external distortion can be controlled. Any reference to internal distortion hereinafter is intended to mean any substantial separation or delamination of the bread product into layers, as viewed in a cross section of the bread product. The external distortion referred to is any substantial blistering, bulging or ballooning of the external surfaces of the bread product which significantly changes the original shape thereof.

It is a very significant feature that the bread product of the present invention has all of the attendant advantages of a totally fried product, namely, a crisp outer shell, but it also has a moist, bready interior. The ability to maintain this moist, bready interior results from the ability to control internal distortion. That is, because separations into layers or the formation of air pockets inside of the bread product are substantially eliminated, the bread product has a continuous moist, bready consistency from face-to-face of the product.

Of course as stated hereinbefore, the method of the present invention also controls external distortion, and thus the external dimensions of the final bread product. Accordingly, the bread products of the present invention can be packaged in standard and uniform size containers for dough sheets having given original dimensions. That is for a dough piece or sheet of a given shape and size the final shape and size are both predictable and controllable by the cooking process of the present invention.

Although the bread product of the present invention may be eaten fresh from the oven following the sequential frying and baking steps, the nature of the resulting-product is particularly well suited for making frozen bread, rolls, pizza, bread sticks, sandwiches, and bread based desserts. The bread product of the present invention maintains its fresh characteristics, namely, a crisp outer shell and a moist, bready interior even following freezing and reheating. This apparently occurs because the initial frying in oil for a controlled period of time seals the surfaces of the bread dough trapping moisture therein and providing a barrier which is not easily penetrated by external moisture accompanying a freezing/thawing process or any toppings or coatings placed thereon. Also since the bread dough surfaces are initially sealed in oil during frying, the absorbed oil in the surface of the dough continues to brown and crisp-up the external surfaces during the subsequent baking process.

In the preferred embodiments of the present invention, the bread dough is formed into substantially flat sheets of predetermined shapes, sizes, and thicknesses before subjecting it to the combined frying and baking cooking process. The frying time which controls both the external and internal distortion discussed hereinbefore is selected as a function of the combined effects of dough moisture content, dough dimensions, and the temperature of the oil in which the dough is fried.

With respect to pizzas and sandwiches prepared in accordance with the present invention, the terms "frozen pizza" or "frozen sandwich" means preprepared pizzas or sandwiches with the toppings or fillings coated on the bread prior to freezing. Although the toppings or fillings could be packaged and frozen separately from the bread, such is not necessary when practicing the inventive steps of the process described herein. That is, separate packaging and freezing are not necessary to achieve a suitable frozen product.

BRIEF DESCRIPTION OF THE DRAWINGS

The objects and many of the attendant advantages of the present invention will be readily appreciated as the same becomes better understood by reference to the following detailed description, which considered, in conjunction with the accompanying drawings, in which like referenced numerals designate like parts throughout the figures thereof, and wherein.

DETAILED DESCRIPTION OF THE DRAWINGS

Figure 1A:
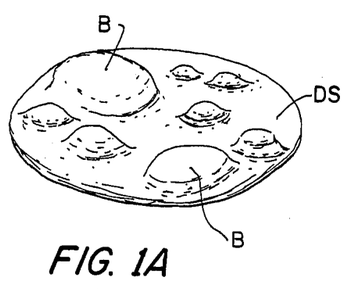
FIG. 1A illustrates a typical form of external distortion that results when a substantially flat dough sheet is totally fried to effect the cooking thereof.

FIG. 1A illustrates a typical type of external distortion which results when a substantially flat dough sheet DS is totally cooked by a frying technique. As illustrated, large blisters B are formed at random locations on the surface of the dough sheet and are of varying sizes making the final dimensions of the dough sheet relatively unpredictable.

Figure 1B:
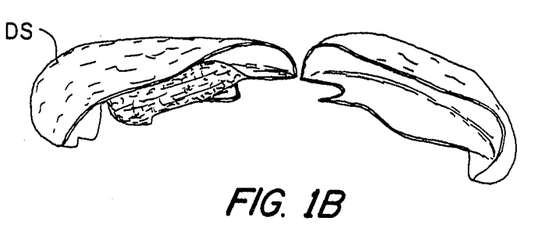
FIG. 1B illustrates a typical form of internal distortion that results in a totally fried, substantially flat dough sheet.

FIG. 1B illustrates a typical type of internal distortion which results if a substantially flat dough sheet DS is totally cooked by frying. As illustrated in FIG. 1B, the particular dough sheet depicted ballooned during the frying process, leaving a substantially hollow dough shell. It can be seen from observing the resulting bread product of FIG. 1B that the consistency of the product is most likely dry and cracker-like in texture, and certainly not moist and bready throughout the interior of the product. The illustration of FIG. 1B further illustrates that the external shape of a dough sheet which is totally fried is relatively unpredictable, the external shape of the FIG. 1B product being clearly different from the external shape of the FIG. 1A product which has only localized blisters or deformations at discrete areas.

Figure 2A:
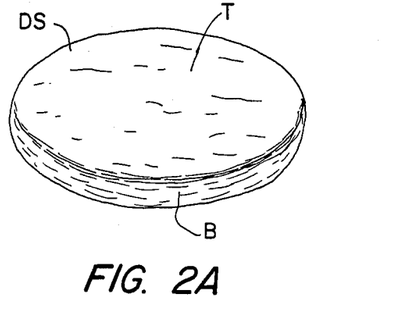
FIG. 2A is a perspective view of a substantially flat dough sheet cooked in accordance with the improved process of the present invention.
Figure 2B:
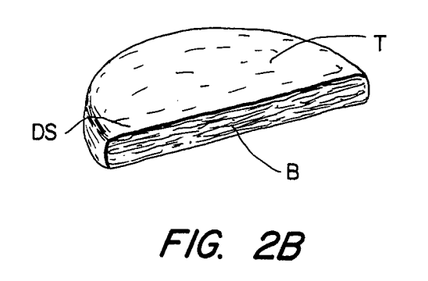
FIG. 2B is a cross-sectional view of a substantially flat dough sheet cooked in accordance with the improved process of the present invention.

Referring in detail to FIGS. 2A and 2B, there is illustrated a dough sheet cooked in accordance with the process steps of the present invention. That is, the dough sheet of FIG. 2A and FIG. 2B was fried only long enough to partially cook the dough sheet, and seal the external surface, and the cooking process was completed by baking the dough sheet in an oven. The specific time limits of frying and baking, as well as other critical parameters of the process will be specified hereinafter by way of specific examples. It is quite clear from the illustration of FIGS. 2A and 2B, that the dough sheet cooked in accordance with the process of the present invention does not contain any external distortions as illustrated in FIG. 2A and also no internal distortions as illustrated in the cross-sectional view of FIG. 2B. Thus, a product having a crisp outer crust, and a continuous moist, bready interior results from the process of the present invention.

The dough sheet depicted in FIGS. 2A and 2B is circular in shape and has a top planar major surface and an opposed bottom planar major surface B. The sheet may have any desired thickness, however, in a preferred embodiment of the present invention the sheet is between one-quarter ($\frac{1}{4}$) and one-half ($\frac{1}{2}$) inches in thickness. Other thicknesses below $\frac{1}{4}$ inch and above $\frac{1}{2}$ inch may be used if desired, but the most favorable results with the process of the present invention were obtained in the one-quarter ($\frac{1}{4}$) to one-half ($\frac{1}{2}$) inch thickness range.

Figure 3A:
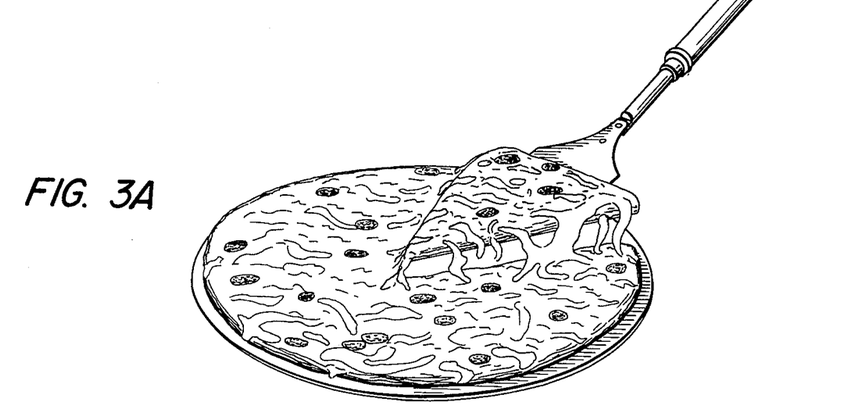
FIG. 3A illustrates one end use to which the dough sheet cooked in accordance with the process of the present invention may be used, namely, as a pizza.
Figure 3B:
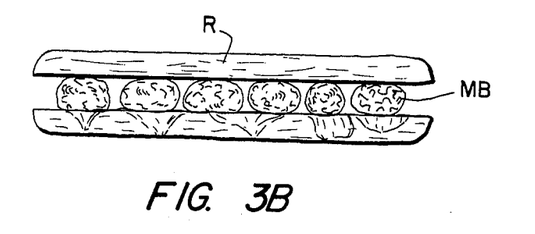
FIG. 3B illustrates a sandwich made from a dough sheet shaped as illustrated in FIG. 2A and cooked in accordance with the improved process of the present invention.

Two typical uses of the cooked bread product of FIGS. 2A and 2B are for making a pizza as illustrated in FIG. 3A, or a meatball Italian sandwich as illustrated in FIG. 3B. As stated hereinbefore, and as will become more readily apparent hereinafter, the bread product of the present invention is particularly well suited for making a frozen pizza, or a pre-prepared frozen meatball sandwich. It has been determined that even after freezing, and reheating the frozen pizza produced by the process of the present invention as well as the frozen meatball sandwich and other possible types of sandwiches, has a crust or roll which remains crisp on the exterior and relatively moist and bready on the interior, which is substantially the same consistency of fresh baked products prior to freezing.

The sandwich of FIG. 3B may be filled with other ingredients than Italian meatballs, if desired, for example, the ingredients may include veal Parmegiana, sausage, cold-cuts, or any other suitable sandwich ingredients. The particular advantage afforded by the bread product of the present invention with respect to making frozen sandwiches with moist ingredients is that the bread product or roll does not become soggy during the freezing and reheating process. This is believed to be a significant improvement over any frozen sandwiches known heretofore.

As illustrated in FIG. 3B, the sandwich roll R, containing the meatballs MB, is formed by cutting the dough sheet of FIG. 2A along a central plane which is horizontally disposed with respect to the dough sheet DS. Thus, the resulting sandwich is disk-shaped like a pizza resulting from the same process. The sandwich of FIG. 3 may be packaged if desired, in the same configuration illustrated in FIG. 3B, and even reheated in that shape. However, in a preferred embodiment it has been found to be desirable to remove the top half of the sandwich roll during reheating to facilitate the complete thawing and reheating of the sandwich filling. That is, if the sandwich is reheated in two portions, it is less likely that the center portion would remain frozen after the reheating process.

Figure 4A:
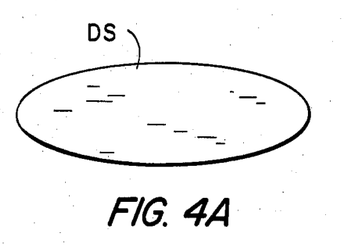
FIG. 4A illustrates another shape of a substantially flat dough sheet which may be utilized in accordance with the present invention.
Figure 4B:
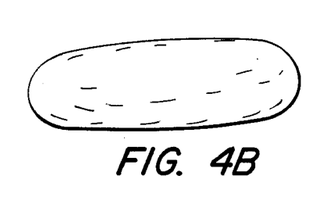
FIG. 4B illustrates the final cooked shape of the elliptically shaped dough sheet of FIG. 4A.

As will be discussed in more detail hereinafter, the pizza product illustrated in FIG. 3A may be prepared by placing the pizza topping directly on top of the cooked dough sheet of FIG. 2A which has two partially fried sides or major surfaces, T and B. However, in another embodiment of the present invention, the dough sheet DS of FIG. 2A may be split down the center as described with respect to the sandwich of 3B, resulting in two cooked pizza shells, each having one partially-fried side and one bready side. In this preferred embodiment, the pizza topping is applied to the bready side, and the pizza is either baked and served immediately, or frozen and reheated for serving at a subsequent time. FIG. 4A illustrates an eliptically shaped, substantially flat dough sheet about one-half ($\frac{1}{2}$) inch in thickness which may be utilized to form a Hoagie or Submarine shaped roll of the type depicted in FIG. 4B. That is, beginning with a substantially flat, elliptically shaped dough sheet of the type illustrated in FIG. 4A, and subjecting that elliptically shaped dough sheet to the cooking process of the present invention, an oblong Hoagie or Submarine roll is obtained by the process of the present invention. Accordingly, a frozen sandwich in accordance with the present invention may be made from the Hoagie roll of FIG. 4B, frozen and reheated for serving if desired.

Figure 5A:
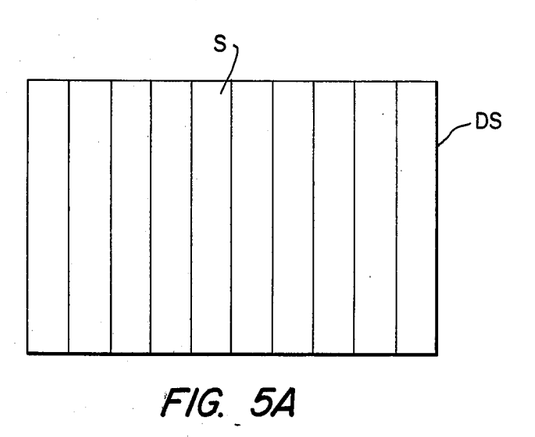
FIG. 5A illustrates a substantially flat dough sheet cut into a plurality of rectangular strips for the purpose of making bread sticks.
Figure 5B:
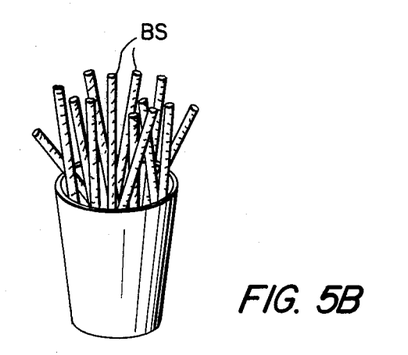
FIG. 5B illustrates in perspective the final shape of the bread sticks made from the dough of FIG. 5A and cooked according to the improved process of the present invention.

FIGS. 5A and 5B illustrate another improved product which can be made from the process of the present invention, namely, bread stricks. FIG. 5A illustrates a substantially flat rectangular dough sheet which may be cut into a plurality of parallel strips of approximately three-eighths ($\frac{3}{8}$) inch in width. The strips are generally indicated S in FIG. 5A. The dough sheet DS of FIG. 5A is in a preferred embodiment, approximately one-quarter ($\frac{1}{4}$) inch in thickness. During the cooking process of the present invention, the individual strips S which are one-quarter ($\frac{1}{4}$) inch in thickness, and three-eighths ($\frac{3}{8}$) inches wide, rise to form substantially cylindrically shaped bread sticks BS, as illustrated in FIG. 5B. The bread sticks in FIG. 5B are illustrated as they would be disposed in a container for consumption in a typical table setting. The bread sticks of the present inventon are unusal compared to bread sticks known heretofore, in that they have a crisp outer shell and a moist bready consistency on the interior thereof. The bread sticks produced by the method of the present invention are particularly well suited for freezing and subsequent reheating without any loss in their fresh baked texture and characteristics. In fact, the bread sticks of the present invention may be frozen and reheated, and will taste exactly like fresh-baked bread sticks.

In a preferred embodiment the strips S are fried for 10 secs. at 360° F. in oil and baked for 20 to 25 minutes at 375° F.

The specific process of the present invention and how it may be implemented is best illustrated by FIGS. 6 to 9 of the drawings and the specific examples to be presented hereinafter.

Figure 6:
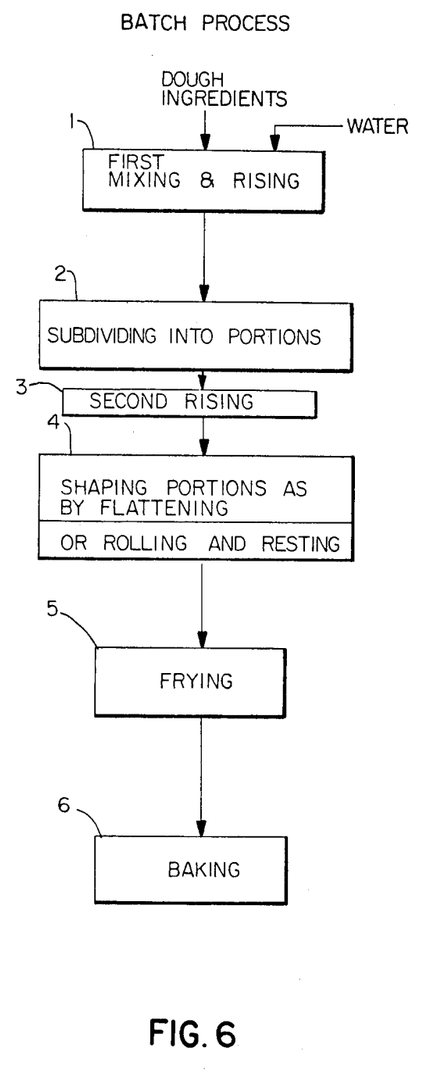
FIG. 6 is a block diagram of a batch type process for producing the bread product of the present invention.

Referring further to the drawings, FIG. 6 represents a general flow sheet of the process of the present invention, and particularly illustrates the main steps of a batch type process.

In step 1 the dough ingredients and water are subjected to thorough mixing, which can be accomplished manually, by an electric mixer, or by the use of one of the recently popular food processing machines. The resulting dough is then formed into a ball, and permitted to stand in a covered container until it roughly doubles in volume. The time will vary, depending on the ambient temperature, for this first rising step.

In step 2, the dough mass is subdivided into a number of portions corresponding to the number of bread pieces it is desired to prepare, which can be in the form of balls, squares, cylinders, etc.

In step 3, the subdivided portions are again permitted to stand until they roughly double in volume, i.e., they undergo a second rising.

In step 4, the subdivided portions are shaped into substantially flat rounds or sheets which are, for example, about six inches in diameter and approximately $\frac{1}{4}$ to $\frac{1}{2}$ of an inch in thickness, as by flattening, rolling, etc., and then permitted to rest 20–30 minutes. The sheets may be thicker than $\frac{1}{2}$ inch or thinner than $\frac{1}{4}$ inch if desired. Also the 20–30 minute proofing period of the rounds or sheets may be eliminated with no detrimental effects.

In step 5, the flat rounds or sheets are placed in a layer of olive oil or other vegetable oil which is insufficient to cover them. The layer of cooking oil can be placed in, for example, a large heavy skillet. The oil is then brought to a frying temperature (360°–370° F.), and the sheets are fried for about 10–20 seconds for a $\frac{3}{8}''$ thick sheet, 5 to 10 secs for a $\frac{1}{4}''$ thick sheet) to seal one flat major surface thereof and partially brown the sauce. The rounds are then turned over, and the other major surface thereof is subjected to a similar frying.

In step 6, the fried sheets are placed into a baking oven at, for example, 375° C., and baked for 15–25 minutes.

Figure 7:
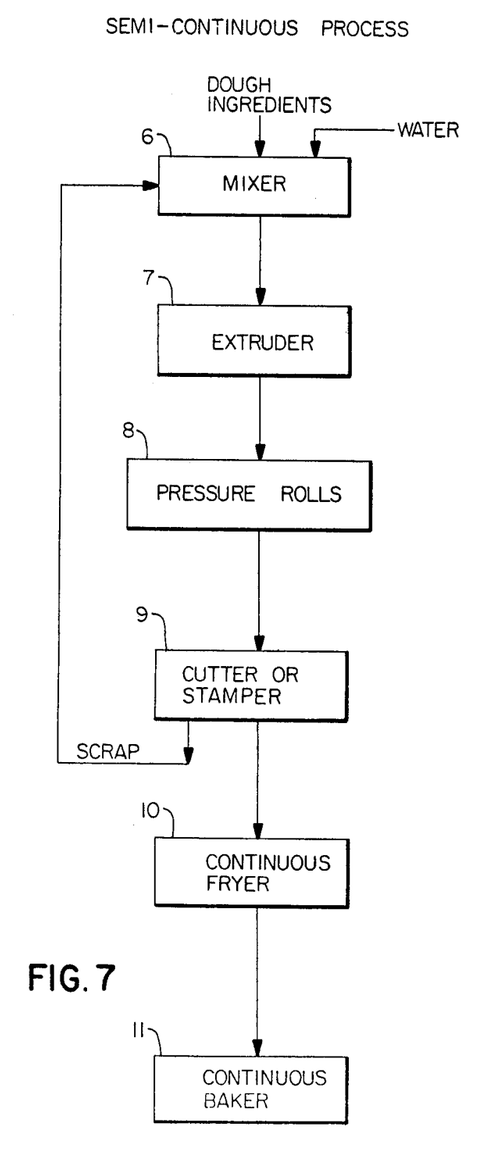
FIG. 7 is a block diagram of a semi-continuous process for forming the bread product of the present invention.

In FIG. 7, a flow sheet illustrates a preferred embodiment of the invention as applied to a semi-continuous process.

In step 7, the dough ingredients and water are subjected to thorough mixing in a commercial type dough mixer having a power driven stirring means. The stirrer is stopped, and the dough mass is permitted to undergo a first rising. The stirrer is again operated for a brief period of time, turned off, and the dough mass permitted to undergo a second rising.

In step 8, the dough is discharged from the dough mixer via an extruding device, which feeds the extruded dough into a powered roller device.

In step 9, the dough thus discharged from the dough mixer is rolled into a sheet of whatever thickness is desired. This may be, as previously stated, of the order of ¼ to ½ of an inch.

In step 10, the rolled sheet of dough leaving the powered roller device is supplied to a stamping or cutting machine, in which it is subdivided into predetermined shapes, e.g., rectangular form, circular form, etc. An example of a stamping device capable of cutting the rolled sheet into circular shapes is, for example, disclosed in U.S. Pat. No. 3,302,592 to Werner issued Feb. 7, 1967. The scrap material formed by this stamping device can be recycled to the dough mixing device, if this is desired.

In step 11, the subdivided and shaped dough masses are then supplied to a frying device of the continuous type. This frying device may be of the type equipped with a feed conveyor and a discharge conveyor, in which at least the discharge end of the feed conveyor is below the level of the frying oil bath and at least the input end of the discharge conveyor is similarly submerged. The subdivided and shaped dough masses leaving the stamping or cutting machine are supplied to the feed conveyor of the continuous fryer, and fall off the discharge end thereof onto the submerged end of the discharge conveyor, and thus removed from said frying device. The frying oil bath is maintained at the desired temperature as above stated, e.g., 360°-370° F., and the speed of the conveyors chosen so that the dough masses are maintained in the frying oil bath for a period of 5-20 seconds, depending on the thickness of the dough.

The dough pieces supplied to the frying device may exhibit a tendency to float, depending upon the specific gravity of said dough pieces and the specific gravity of the frying oil. If the dough pieces do exhibit a tendency to float, then the frying device previously described may also be provided with barriers which are placed parallel to, and closely adjacent, to the top portions of both the feed and discharge conveyors. There is thereby formed a confined path for the dough pieces, which nullifies any tendency thereof to float. However, such barriers need not be placed close enough to the conveyors to restrict any rising or change in thickness of the dough.

In step 12, the fried dough masses leaving the discharge conveyor of the continuous frying device are supplied to a baking device of any desired type. The baking device may be, for example, of the type supplied with a feed conveyor, conveyors having adjustable speeds traversing the interior of oven space so that the fried dough masses can be maintained therein for any desired length of time, and finally a discharge conveyor for removing the baked dough masses from said oven space. The interior of the oven space can be maintained at any desired baking temperature, e.g., 375° C., and the speed of the conveyors within the oven space adjusted so that the dough masses are maintained in said oven space for a period of about 15-25 minutes.

Figure 8:
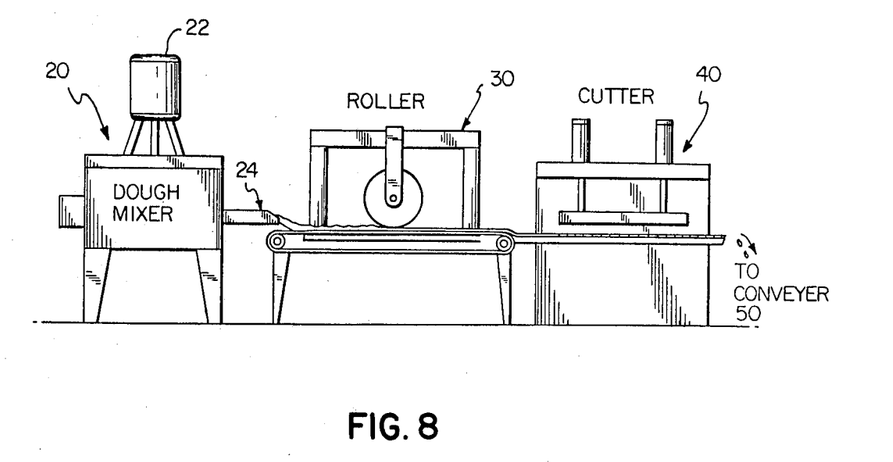
FIGS. 8 and 9 illustrate an apparatus suitable for carrying out the semi-continuous process illustrated in FIG. 7.
Figure 9:
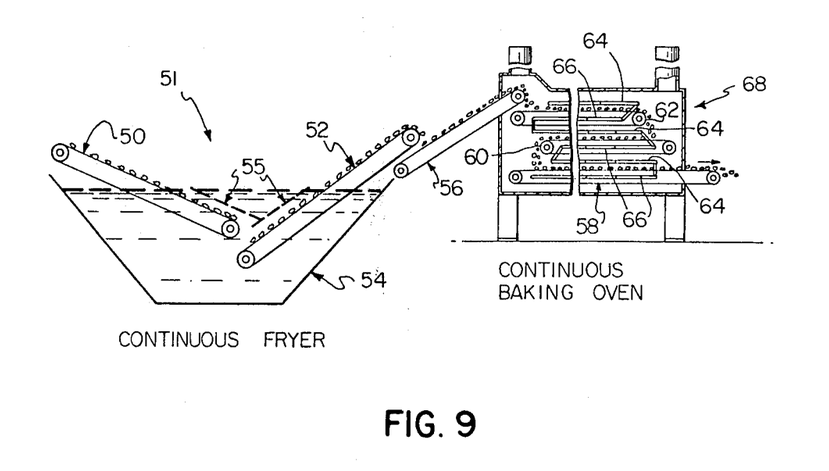

FIGS. 8 and 9 illustrates an apparatus suitable for carrying out the semi-continuous process of FIG. 7.

As shown in FIG. 8, the ingredients forming the dough are mixed together in a dough mixer, such as indicated at 20, having a power means 22 driving the same.

The dough mass formed in the dough mixer 20 is discharged via the extruder device 24, as a continuous sheet of dough, into the feed end of the rolling mechanism, in which it is rolled into a sheet of the desired thickness. The rolling mechanism, indicated at 30, discharges the rolled sheet of dough into a slicing or cutting machine, indicated generally at 40, which machine cuts the dough sheet into predetermined shapes, e.g., such as rectangular forms.

As shown in FIG. 9, the shaped pieces of dough leaving the cutting device 40 are then supplied to the input conveyor 50 of the frying device indicated at 51. The input conveyor extends into a tank 54 and below the surface of a bath of frying oil contained therein. The shaped pieces of dough on the input conveyor 50 are then dropped into the lower end of a discharge conveyor 52. The pieces of dough travelling on the discharge conveyor 52 are then supplied to the input conveyor 56 of a baking oven of the radiant type. The temperature of the bath of frying oil can be maintained at any desired level, and further the speed of the feed and discharge conveyors can be adjusted so that the shaped pieces of dough are submerged in the bath of frying oil for any desired residence period, preferably 5 to 20 seconds depending on the dough thickness.

If the dough pieces supplied to the frying device 51 exhibit any tendency to float, then said frying device may be equipped with a pair of barriers 55 which serve to form a confined path above the surfaces of the input conveyor 50 and the discharge conveyor 52. Said barriers 55 can be, e.g., merely wire screens which are coextensive with the input and discharge conveyors. In the alternative, they can even be a pair of conveyors, similar to input conveyor 50 and discharge conveyor 52, so disposed that the undersides thereof are spaced from the upper-sides of said input and discharge conveyors, and arranged to travel in the same direction. In this manner a closely confined path is formed, in which the dough pieces are impelled not only by the input or discharge conveyor but also by the closely adjacent barrier conveyor. It should be understood that in the process of the present invention the barriers 55 may, but need not be, close enough to conveyors 50, 52 to restrict rising or distortion of the dough sheets.

Further, as shown in FIG. 9, the baking oven of the radiant type indicated generally at 68, has housed therein three horizontally oriented, vertically spaced apart, endless conveyors 58, 60 and 62. Each of said conveyors 58, 60 and 62 is disposed between a pair of horizontally oriented radiant heaters 64 and 66. The discharge conveyor 52 of the continuous fryer 51 deposits the fried dough pieces removed from said continuous frying device on the surface of the conveyor 62 which moves between a pair of radiant heaters 64 and 66. At the end of the run of conveyor 62, the fried dough pieces fall onto the surface of the conveyor 60, which is staggered relative to the conveyor 62 to receive the falling fried dough pieces. The fried dough pieces are then conveyed between a second pair of radiant heaters 64 and 66 in a direction opposite to that followed by the topmost conveyor 62. At the end of this run the fried dough pieces fall onto the surface of the conveyor 58, and are again conveyed in the reverse direction between a third pair of radiant heaters 64 and 66. At the end of this run the finished bread pieces are removed from the radiant oven 68 by the conveyor 58, which extends through the right hand end wall of said radiant oven 68. The temperature of baking on each of conveyors 58, 60 and 62 can be adjusted as desired by control of each pair of radiant heaters 64 and 66, and the residence period of each bread piece in said radiant oven 68 can be controlled by adjustment of the speed of said conveyors 58, 60 and 62.

EXAMPLE I

The following ingredients are intimately admixed to form the dough in the following proportions:

1½ envelopes granular yeast
4 tablespoons lukewarm water
1 cup cold water
2 tablespoons butter
3½ cups unsifted flour
1 teaspoon salt This mixture contains approximately ⅓ water by weight.

The dough is formed by carrying out the following steps:

1. In a mixing bowl, blend the granular yeast with the four tablespoons of lukewarm water. Stir to dissolve the yeast.
2. In a saucepan, combine the cup of cold water with the butter. Heat slowly until butter melts (a thermometer is not essential, but the best temperature for this is 95 to 110 degrees.)
3. To the container of a food processor, add the flour and salt. Blend the flour and salt by activating the motor on and off briefly three times.
4. With the lid and motor off, add the dissolved yeast mixture.
5. With the lid and motor off, add the water and butter mixture.
6. Blend until dough becomes a ball and clears the side of the container—about five to ten seconds.
7. Lightly flour a clean surface and turn the dough out onto it. With floured fingers, knead the dough quickly and gently. This is primarily for shaping the dough. Do not add an excess of flour at any time. Shape the dough into a ball.
8. Add the ball of dough to a lightly buttered mixing bowl. Cover with a clean cloth and place the bowl in a warm place. Let stand until double in bulk. The time will vary, depending on the temperature around the bowl. The time for this rising should be approximately 40 minutes.
9. Turn the dough out onto a lightly floured surface and knead briefly. Shape into a ball and return the dough to the bowl cover and let stand about one hour, more or less, until double in bulk.
10. After second rising, cut dough into 8-ounce pieces and let stand 10 minutes.
11. Shape each piece of dough into flat 6-inch diameter rounds which are approximately ⅜ inch thick.
12. Allow pieces of dough resulting from above to rest 10-20 minutes.
13. Place olive oil (or other vegetable oil) in a large heavy skillet.
14. Bring oil temperature of frying (360°-375° F.) and fry each round of dough resulting from above for 10-20 seconds. Turn over each round, and repeat frying.
15. Place results of above into 375° F. over and bake for 15-25 minutes.

The resulting bread product will have a crisp outer shell and a moist, bready interior. The external surfaces will remain flat and undistorted resembling the cooked dough sheet illustrated in FIG. 2A and the interior will have a continuous bready consistency from top to bottom, as illustrated in FIG. 2B, without any large air pockets or delaminations.

If a ¼ inch thick dough sheet is used the frying time at 360° F. should be from 5 to 10 seconds to achieve the above-described undistorted characteristics. For a dough sheet of ⅜ inch thickness or larger, the frying time at 360° F. should be from 10 to 20 seconds in order to achieve the bread product having the above-described undistorted characteristics. The baking time at 375° F. can be from 15 to 25 minutes for both specified thicknesses and still achieve the distortion free characteristics.

EXAMPLE II

In a preferred embodiment of the present invention the following ingredients are intimately admixed to form the dough in the following proportions:

1¼ cups warm water (110° F.)
2 Tablespoons sugar
1 package yeast
4 cups flour (bakers or all purpose)
1 teaspoon salt This mixture constitutes about 33⅓% by weight of water.

The dough is formed by carrying out the following steps:

1. Place water, sugar and yeast in bowl and let stand fifteen minutes.
2. Add flour and salt
3. Blend all ingredients
4. Knead dough until it becomes smooth like velvet (approximately 15 minutes by hand, 5 minutes with electric powered kneader)
5. Carry out a first rising of dough, i.e., letting it stand until it roughly doubles in volume (approx. 1-1½ hours)
6. Subdivide dough into desired number of portions.
7. Permit portions to stand until they roughly double in volume. (approx. 1-1½ hours)
8. Flatten portions into flat rounds which are about 6 inches in diameter and ¼ to ½ of an inch thick, and then permit to proof for 20-30 minutes. It has been found that proofing is optional and not necessary to achieve a successful product.
9. Place olive oil (or other vegetable oil) in a large heavy skillet.
10. Bring oil temperature to frying (360°-370° F.) and fry each round or sheet of dough resulting from above for 15-20 seconds. Turn over each round, and repeat frying.
11. Place results of above into 375° F. oven and bake for 15-25 minutes.

The resulting bread product will have a crisp outer shell and a moist, bready interior. The external surfaces will remain flat and undistorted resembling the cooked dough sheet illustrated in FIG. 2A and the interior will have a continuous bready consistency from top to bottom, as illustrated in FIG. 2B, without any large air pockets or delaminations.

If a ¼ inch thick dough sheet is used the frying time at 360° F. should be from 5 to 10 seconds to achieve the above-described undistorted characteristics. For a dough sheet of ⅜ inch thickness or larger the frying time at 360° F. should be from 10 to 20 seconds in order to achieve the bread product having the above-described undistorted characteristics. The baking time at 375° F. can be from 15 to 25 minutes for both specified thicknesses and still achieve the distortion-free characteristics.

The products obtained by the above examples are edible by themselves and also serve as the basic ingredient in making other products when subjected to further processing. For example, when the bread-like product is split (or used as is), appropriate other ingredients added thereto, and then subjected to further baking, products such as pizza, garlic bread, hors d'oeuvres, and sweet pastry may be obtained. In this connection, it is pointed out that after the bread-like product cools from the first baking, the second baking or reheating actually appears to enhance the bread texture and flavor.

As further pointed out hereinbefore that the bread product obtained by the invention is extremely useful in the preparation of other products containing the same which are subjected to freezing and reheating. The frozen product of the present invention can be taken directly from refrigeration and permitted to return to room temperature. This thawed product retains the crispness of the product before it was subjected to refrigeration, and does not become soggy as is usually the case when such a product is allowed to return to room temperature.

EXAMPLE III

Of particular interest is the use of the product of the present invention in the preparation of pizza and garlic bread. A pizza and garlic bread utilizing the bread-like product of the present invention can be prepared as in Example I or II. The flat bread-like pieces are then split down the middle to make two pieces of equal size and approximately half the thickness. The unfried side of the pieces are then covered with tomato paste, sausage, cheese, garlic butter, etc. and placed into a freezer for storage purposes. If desired, the bread can be used without splitting the same to form two pieces. In this event, the dough before frying would preferably be considerably thinner; e.g., ¼ inch and the pizza sauce or garlic butter would be applied directly to the top surface of the dough which has been sealed by frying. The frozen pizzas or garlic breads are subsequently removed from the freezer, placed in an oven set at 375° F. (not preheated), and baked for 25–35 minutes. Again, similarly as described above, the bread-like portions of said pizza remains crisp on the outside, moist and bready on the inside with neither external nor internal distortion of the pizza crust, and are not affected by the sogginess problem usually accompanying the heating of such a refrigerated product.

EXAMPLE IV

The steps of Example I, II, or III may be repeated using a semicontinuous deep-frying process rather than a skillet turnover method described therein. That is in steps 9 and 10 the olive oil is provided in a sufficient depth to cover both planar major surfaces of the dough sheets. The oil may be placed in a skillet or in the commercial frier illustrated in FIG. 9.

Tests were performed in accordance with Example IV in a laboratory environment as follows.

1. A batch of dough was prepared as described according to steps 1 to 7 Example II.

2. The dough was formed into flat rounds of about six inches in diameter. Some were made ¼ inch thick and some ⅜ inch thick in order to compare the results of the cooking times for the respective thicknesses.

3. Oil was placed in a large skillet in a sufficient depth to completely cover both sides of the ¼ or ⅜ inch rounds of dough.

4. The skillet was heated on a gas range (Magic Chef—"Chateau Gas Range", 217 series) to bring the oil temperature to 360° F. The oil temperature was constantly monitored by a mercury thermometer to assure a relatively constant oil temperature.

5. Seven dough rounds were sequentially tested by placing each round in a wire basket having a porous bottom wall and a porous top wall to preclude the dough rounds from floating to the surface. The top and bottom walls were not close enough together to restrict the rising of the dough, i.e., these walls did not function as a mold.

6. The respective dough rounds or sheets contained in the above-described basket were submerged in the 360° F. oil, fried and subsequently baked in the oven of said "Chateau Gas Range" for the respective times indicated in the following chart:

| Test No. | Frying Time | THICKNESS Before Frying | After Frying & Baking | Frying Temp. | Baking Temp. | Baking Time |
| --- | --- | --- | --- | --- | --- | --- |
| 1 | 5.89 secs. | ¼" | 11/16" | 360° F. | 375° F. | 18 min |
| 2 | 11.05 secs. | ¼" | 11/16" | 360° F. | 375° F. | 18 min |
| 3 | 15.56 secs. | ¼" | 1" | 360° F. | 375° F. | 18 min |
| 4 | 15.55 secs. | ⅜" | 1¼" | 360° F. | 375° F. | 18 min |
| 5 | 20.89 secs. | ⅜" | 1¼" | 360° F. | 375° F. | 18 min |
| 6 | 25.77 secs. | ⅜" | 1-5/16" | 360° F. | 375° F. | 18 min |

The ¼" dough sheet fried for 5.89 secs. showed no detectable external or internal distortion.

The ¼" dough sheet fried for 11.05 secs. showed only minimal external and internal distortion.

The ¼" dough sheet fried for 15.56 secs. showed clear signs of external and internal distortion.

The ⅜" dough sheet fried for 15.55 secs and 20.89 secs showed no detectable external or internal distortion.

The ⅜" dough sheet fried for 25.77 secs. showed the beginnings of both external and internal distortion.

Accordingly, it can be concluded from the above described tests that an optimum frying time for ¼" thick dough sheets prepared in accordance with Example IV is 5 to 10 secs. while an optimum time for a ⅜" thick dough sheet is 10 to 20 secs. Of course the ⅜" dough sheet could be fried for less than ten seconds without distortion.

It should be understood that "optimum time" refers only to the dough sheets prepared in accordance with Example IV, the frying time varying with the dimensions of the dough sheets, the frying oil temperature and the moisture content of dough. It should be further understood in Example IV that frying times just beyond the optimum ranges will provide bread products which are still an improvement over the prior art. For example, to achieve the extreme distortions depicted in FIGS. 1A and 1B might require a frying time in excess of 40 seconds for a ⅜" thick dough sheet.

Of course a thicker dough sheet of ½ inch or more will permit longer frying times without distorting, while a thinner dough sheet of ⅛ inch or less will require shorter frying times to preclude both internal and external distortion.

EXAMPLE V

The steps of Example I, II, or III may be repeated using a semicontinuous deep-frying process rather than a skillet turn-over method described therein. That is in steps 9 and 10 the olive oil is provided in a sufficient depth to cover both planar major surfaces of the dough sheets. The oil may be placed in a skillet or in the commercial frier illustrated in FIG. 9.

Tests were performed in accordance with Example V in a laboratory environment as follows.

1. A batch of dough was prepared as described according to steps 1 to 7 of Example II.

2. The dough was formed into flat rounds of about six inches in diameter and ⅛ inch in thickness.

3. Oil was placed in a large skillet in a sufficient depth to completely cover both sides of the ⅛ inch rounds of dough.

4. The skillet was heated on a gas range (Magic Chef—"Chateau Gas Range", 217 series) to bring the oil temperature to 360° F. The oil temperature was constantly monitored by a thermometer to assure a relatively constant oil temperature.

5. Two dough rounds were sequentially tested by placing each round in a wire basket having a porous bottom wall and a porous top wall to preclude the dough rounds from floating to the surface. The top and bottom walls were not close enough together to restrict the rising of the dough, i.e., these walls did not function as a mold.

6. The two respective dough rounds or sheets contained in the above-described basket were fried in oil at 360° F. for approximately five and 10 seconds, respectively.

7. The dough sheet fried for five (5) seconds was then baked in an oven for twelve (12) minutes at 375° F. The dough sheet fried for ten (10) seconds was baked for twenty (20) minutes at 375° F.

Both of the resulting-cooked dough sheets had a series of small surface blisters but did not undergo a significant overall dimensional change, i.e., an overall change in shape. Thus, the dough sheets resulting from the process of Example V would be suitable for commercial packaging in standard size boxes and were crisp on the outside, but did not have a totally moist, bready consistency from face-to-face internally thereof because of the air pockets under the blisters.

The consistency of the ⅛ inch thick dough sheet fried for five (5) seconds and baked for twelve (12) minutes was preferable to the one fried for ten (10) seconds and baked for twenty (20) minutes.

MODIFICATIONS AND EQUIVALENTS

In a batch process, as described above, the following modifications are possible.

In step 1, it is not necessary to remove the dough mass from the container of the food processor, wherein it is initially formed as a ball that clears the side of the container. It can be permitted to rise in said container, subjected to a brief kneading therein, and then permitted to rise a second time therein.

Steps 2 and 3 can be replaced by the following procedure. The dough mass can be rolled out into the form of a sheet of about ¼ to ½ of an inch in thickness. It can then be cut into pieces of the desired shape. This can be accomplished, for example, using the device shown in U.S. Pat. No. 2,734,465 to Head, issued Feb. 14, 1956.

In step 5, the fried rounds can be baked in many different ways other than in the ordinary convective type of baking oven in which the baking of the fried rounds is effected by hot air in contact therewith. For example, the baking could be effected in an ordinary electric boiler, in which the fried rounds are placed on a flat surface underneath a radiantly glowing coil of electric resistance wire.

In a semi-continuous process as described above with respect to FIG. 7, the following modifications are possible.

Steps 6-10 can be modified as follows. The extruder device of the dough mixing device described in step 7, can be modified to deposit the dough in the form of a ribbon of the desired width and thickness onto the feed conveyor of the frying device described in step 10. Near the lower end of said feed conveyor, which is still above the surface of the bath of frying oil, there can be arranged a cutter blade mounted on a crank driven by an electric motor. The cutter blade will cut the ribbon of dough into pieces which will then drop onto the lower end of the discharge conveyor, i.e. submerged below the surface of the bath of frying oil. Such an arrangement is taught in FIG. 8 of U.S. Pat. No. 2,791,508 to Rivoche issued May 7, 1957. See particularly cutter blade 125, crank 126, and electric drive motor 127.

In step 11, the baking device can be of any desired kind other than of the radiant heating type. For example, the final baking step of the fried dough masses, although not as desirable could be performed in a microwave type of oven of the kind shown in FIG. 2 of U.S. Pat. No. 3,365,301, issued Jan. 23, 1968. Briefly speaking, the fried dough masses are conveyed thru the microwave oven on a conveyor belt, said microwave oven being operated at a frequency of about 910 megacycles/second. A continuous flow of warm air thru the microwave chamber serves to remove any accumulated moisture therefrom.

In addition, in either the batch or semi-continuous process the dough before frying and baking can be mixed with sausage, pepperonies, or any other desired edible substances.

It should be understood that the process and product described herein may be modified as would occur to one of ordinary skill in the art without departing from the spirit and scope of the present invention.

What is claimed is:

1. A method of making a bread product comprising the steps of:
   a. preparing a bread dough;
   b. forming the bread dough into a substantially flat sheet having two opposed planar major surfaces and a predetermined thickness between said major surfaces;
   c. frying the dough sheet to only partially cook the same for a period of time sufficient to seal said surfaces but insufficient to permit substantial distortion of said planar major surfaces or to permit said dough sheet to separate internally thereof into different layers separated by air; and
   d. baking the dough subsequent to frying to substantially complete the cooking thereof to obtain a cooked dough sheet with a crisp outer shell and a moist, bready interior and substantially the same shape as the originally formed dough sheet.

2. A method of making a bread product comprising the steps of:
   a. preparing a bread dough of a predetermined moisture content;
   b. forming the bread dough into a substantially flat sheet having two opposed planar major surfaces and a predetermined thickness between said major surfaces;
   c. frying the dough sheet of a predetermined temperature to only partially cook the same for a period of time sufficient to seal the surfaces but insufficient to permit substantial distortion of said planar major surfaces or to permit said dough sheet to separate internally thereof into different layers separated by air, said period of time being selected as a function of the combined effects of dough moisture content, dough dimensions, and temperature of said liquid; and d. baking the dough sheet subsequent to frying to substantially complete the cooking thereof to obtain a cooked dough sheet with a crisp outer shell and a moist, bready interior and substantially the same shape as the originally formed dough sheet.

3. A method of making a frozen pizza comprising the steps of:

a. preparing a bread dough;

b. forming the bread dough into a substantially flat sheet having two opposed planar major surfaces and a predetermined thickness between said major surfaces;

c. frying the dough sheet to only partially cook the same for a period of time sufficient to seal said surfaces but insufficient to permit substantial distortion of said planar major surfaces or to permit said dough sheet to separate internally thereof into different layers separated by air;

d. baking the dough subsequent to frying to substantially complete the cooking thereof to obtain a cooked dough sheet with a crisp outer sheel and a moist, bready interior and substantially the same shape as the originally formed dough sheets;

e. coating one of said planar major surfaces with selected constituents of a pizza topping; and f. freezing the coated dough sheet to form a frozen pizza.

4. The method of claim 3 wherein said period of time of step c is selected as a function of the combined effects of dough moisture content, dimensions, and temperature of said liquid.

5. A method of making frozen pizza comprising the steps of:

a. preparing a bread dough;

b. forming the bread dough into a substantially flat sheet having two opposed planar major surfaces and a predetermined thickness between said major surfaces;

c. frying the dough sheet to only partially cook the same for a period of time sufficient to seal said surfaces but insufficient to permit substantial distortion of said planar major surfaces or to permit said dough sheet to separate internally thereof into different layers separated by air; and d. baking the dough subsequent to frying to substantially complete the cooking thereof to obtain a cooked dough sheet with a crisp outer shell and a moist, bready interior and substantially the same shape as the originally formed dough sheet;

e. splitting the cooked dough sheet along a central plane substantially equidistant between said two opposed planar major surfaces to form two sheets each having one fried surface and an opposed unfried surface of a moist, bready consistency;

f. coating said unfried surfaces with selected constituents of a pizza topping; and g. freezing the coated sheets to form frozen pizzas.

6. A method of making a frozen sandwich comprising the steps of:

a. preparing a bread dough;

b. forming the bread dough into a substantially flat sheet having two opposed planar major surfaces and a predetermined thickness between said major surfaces;

c. frying the dough sheet to only partially cook the same for a period of time sufficient to seal said surfaces but insufficient to permit substantial distortion of said planar major surfaces or to permit said dough sheet to separate internally thereof into different layers separated by air;

d. baking the dough subsequent to frying to substantially complete the cooking thereof to obtain a cooked dough sheet with a crisp outer shell and a moist, bready interior and substantially the same shape as the originally formed dough sheet;

e. splitting the cooked dough sheet along a central plane substantially equidistant between said two opposed planar major surfaces to form two sheets each having one fried surface and an opposed unfried surface of a moist bready consistency;

f. applying a sandwich filling of selected constituents to at least one of said unfried surfaces; and g. freezing said dough sheets and sandwich filling to form a frozen sandwich.

7. The product formed by the process of claim 1.
8. The product formed by the process of claim 2.
9. The product formed by the process of claim 3.
10. The product formed by the process of claim 4.
11. The product formed by the process of claim 5.
12. The product formed by the process of claim 6.
13. The process of claims 1, 2, 3, 4, 5, or 6 wherein said predetermined thickness of said dough sheet is at least three-eighths (⅜) inch, said period of time of step c is 10 to 20 seconds, the frying temperature is in the range of 350° to 360° F., and the dough contains approximately 33% water by weight.

14. The process of claim 13 wherein said baking step is performed in a 375° F. oven for 15 to 25 minutes.

15. A method of preparing the frozen products formed by the processes of claims 4, 5, or 6 for consumption including the further step of heating the said frozen product in an unpreheated oven at a temperature of 375° F. for a period of 25 to 35 minutes.

16. The process of claims 1, 2, 3, 4, 5 or 6 wherein said predetermined thickness is at least one-quarter (¼) inch, said period of time of step c is 5 to 10 seconds, the temperature of said liquid is in the range of 360° to 370° F., and the dough contains approximately 33% water by weight.

17. A method of making bread sticks comprising the steps of:

a. preparing a bread dough;

b. forming the bread dough into a substantially flat sheet having two opposed planar major surfaces and a predetermined thickness between said major surfaces;

c. cutting said flat sheet into a plurality of elongated flat strips;

d. frying said strips to only partially cook the same for a period of time sufficient to seal said surfaces but insufficient to permit substantial distortion of the external surfaces thereof or to permit said dough sheet to separate internally thereof into different layers separated by air;

e. baking the strips subsequent to frying to substantially complete the cooking thereof to obtain cooked substantially cylindrical sticks with a crisp outer shell and a bready interior; and f. freezing said cylindrical sticks.

18. The product formed by the process of claim 17.

* * * * *